United States Patent Office 3,282,979
Patented Nov. 1, 1966

3,282,979
PHENOLIC THIOETHERS
Walter Reifschneider, Midland, and Jacqueline S. Kelyman, Auburn, Mich., assignors to The Dow Chemical Company, Midland, Mich., a corporation of Delaware
No Drawing. Filed June 17, 1963, Ser. No. 288,511
9 Claims. (Cl. 260—465)

The present invention is concerned with organic chemical synthesis and is directed to certain new phenolic thioethers and particularly to a new method of preparing phenolic thioethers of the general formula $$\begin{array}{c} OH \\ | \\ Ar-R_n \\ | \\ SR' \end{array}$$

wherein Ar is a 6 or 10-carbon aromatic hydrocarbon nucleus, R is alkyl, alkenyl, alkynyl, cycloalkyl, aralkyl, aryl, alkoxy, aryloxy, hydroxy, nitro, cyano, amido, hydrocarbyloxycarbonyl, or halogen, R' is alkyl, alkenyl, alkynyl, cycloalkyl, haloalkyl, aralkyl, or alkanoyl, and $n$ is an integer from 0 to four, both inclusive. The nucleus Ar is such that the present compounds are all substituted benzene or naphthalene derivatives.

The products of the present invention have numerous uses. Those in which unsaturated substituents appear are useful as monomers in the synthesis of polymeric substances. The compounds themselves are insecticidal, although some are substantially more active in this use than are others. Various of the compounds possess herbicidal properties. The compounds are germicidal.

The fundamental aspect of the present discovery is that a (thiocyanato)phenol or substituted (thiocyanato)phenol or a corresponding naphthol derivative reacts at the (thiocyanato) site with a haloaliphatic compound in some way to obtain, at the site formerly occupied by the (thiocyanato) group a thioether substituted upon the phenol or naphthol. Halogenated compounds of a wide range are useful; the halohydrocarbons are representative but not definitive. The general reaction of the present invention is thus represented by the following equation:

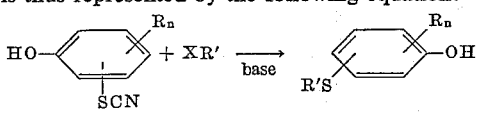

wherein X is a halogen and $n$, R and R' have the meanings hereinbefore set forth. A naphthol can be used as is a phenol. The reaction appears to involve a metathesis of some sort but byproducts of reaction have not yielded easily to attempts to identify them.

Because the present reaction involved only the (thiocyanato) group of the arenol, virtually any naphtholic or phenolic compound possessing this group can be used. In addition to the position isomers of the hydroxyaryl thiocyanates, the various alkylhydroxyaryl thiocyanates can be employed. Also, with equally good results, the various alkenyl and alkynyl hydroxyaryl thiocyanates, including those having more than one ethylenic or acetylenic unsaturation per alkenyl or alkynyl moiety. Also, such aromatic or mixed ethers as the alkoxy- or aryloxy-hydroxyaryl thiocyanate compounds are employed with good results. It is to be understood that the alkoxy- or aryloxy-portion is in addition to, not at the expense of, the aromatic hydroxy group. Also aryl substituents upon the hydroxyaryl thiocyanate nucleus are acceptable. Similarly, such other substituents as may affect the properties of the resulting products but do not interfere with the reaction at the thiocyanato-site can be present upon the hydroxyphenyl ring; these include the cyano radical, amido structures, and the ester structures presently identified as organic-oxycarbonyl, as represented by the hydrocarbyl-oxycarbonyl moieties. These latter designations indicate monovalent organic radicals of the formula

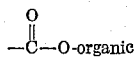

and particularly

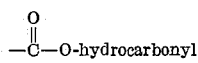

Commonly the thiocyanato radical will be in a position para with respect to the aromatic hydroxyl group; but this is immaterial in the present invention.

As base, there can be employed the bases commonly known and used; alkali metal hydroxides, alkali metal alkoxides, alkali metal carbonates, basic ion exchange agents, strong amines, and so forth. The identity of the base, or its strength, do not appear to be critical; in general it is advantageous that the base be strong.

As to the haloorganic compound, it is critical that the halogen be relatively available for reaction. This requirement is consistently met when the halogen is bonded to an aliphatic group or moiety but usually fails to be met when the halogen is bonded to an aromatic nucleus. Thus a halobenzene will not enter the present reaction as halo-organic compound, whereas a haloalkane does so readily. Halogen on an aliphatic side chain on an aromatic nucleus reacts readily. Thus in an α,4-dichlorotoluene, the α chlorine reacts readily in the present synthesis, whereas the aromatic 4-chlorine does not, even under exalted conditions.

The nature of the site to which the halogen is bonded is much more important than the identity of the halogen. Fluorine, despite the stability of its bond with organic moieties, is satisfactory. Chlorine, by reason of its low cost and excellent performance, is often preferred. Bromine reacts very readily but is more expensive than chlorine and sometimes sterically hindered in situations that admit of the use of chlorine. Cost and steric hindrance also affect a decision to employ iodine, but it is available as a reactive halogen.

The reactivity of the halogens varies approximately directly as molecular weight. Thus in a chlorobromo aliphatic compound, the bromo site reacts first and, in the presence of less than an excess of (thiocyanato)phenol or naphthol compound, exclusively. In the presence of a stoichiometric excess of the (thiocyanato)phenol or naphthol, the bromo site reacts first, and the chloro site thereafter. Similarly, fluorine is least reactive, and iodine most. Thus the position of substituents and the course of alternative reactions can to a large extent be controlled.

The reactants can be combined in any order or sequence. Advantageously, the base reactant is added last. Mixtures of reactants containing less than all the reactants can be prepared in advance and held for later use, to be mixed into a complete reaction mixture as desired. Reaction begins and product beings to be prepared as the reaction mixture is completed.

Because the present reaction is believed to have been unknown hitherto, some doubt existed at first, as to the identity of products. Careful studies characterizing products have been made.

Products have been characterized by such traditional methods as mixed-melting-point determinations with authentic samples of compounds of assigned structure, infrared spectroscopy, preparation of derivatives, and other physical and chemical methods.

The reaction follows the indicated course, goes forward smoothly, obtains good yields, and makes efficient use of starting materials. Upon combining the reactants, the reaction goes forward at a good rate at temperatures as low as 0° C. It proceeds at a good rate at room temperature, and usually reaches completion in from two to four hours, depending upon the identities and quantities of reactants employed, actual temperature, whether stirring is employed and other known factors. At lower temperatures, times of up to 200 hours may be desired for good yield, whereas at superambient reflux temperatures in solvent, shorter times may give good results.

Some of the desired product is formed immediately upon the contacting together of the reactants and when small yield of product in the presence of relatively large amounts of unconsumed starting material is satisfactory, the reaction mixture can be employed in crude form shortly after the initiation of the reaction to obtain at least minimum benefits according to the present invention. If desired, the reaction may be permitted to go forward to a desired degree of completion or to its natural termination point, and the crude reaction mixture thereof subsequently employed.

When it is desired to obtain products in highly purified form, the reaction mixture can be warmed, optionally under subatmospheric pressure, to vaporize and remove liquid reaction medium, if any, and the resulting product-containing residue stirred into a mixture of ice and concentrated non-oxidizing mineral acid. Typically, ice melts or partially melts, diluting the acid which acid also neutralize any unconsumed base. The use of ice limits the rise of temperature to a temperature which is not injurious to desired product. However, the product is not usually highly heat-sensitive.

From such ice and acid treatment, product typically separates as a solid, as a gum or oil, or as a liquid.

When product separates in the acid-ice mixture as a solid, it is conveniently collected by permitting the ice to melt completely, filtering the resulting mixture, to recover the typically insoluble solid product, which can then be used as a partially pure substance. When greater purity is desired, the purification can employ also washing with water and drying and thereafter recrystallizing the residue from the filtration in a suitable solvent such as methyl cyclohexane, benzene or a petroleum fraction boiling in the temperature range of 60–70° C. and so forth.

When the product separates from the ice and acid mixture as a gum or oil, the aqueous mixture can be conveniently extracted with solvent. This can be a recrystallization solvent, or diethyl ether. The solvent or ether layer is then separated. The separated layer is thereafter washed with water to remove traces of acid, and can also be washed with saturated sodium chloride solution. The resulting washed solution can then be dried over anhydrous sodium sulfate and thereafter warmed to vaporize and remove diethyl ether by evaporation and the resulting residue recrystallized from a suitable solvent, or, if more convenient, distilled optionally under subatmospheric pressure.

When the product separating in the acid-ice mixture is a liquid, the same procedures are as employed in the purification of a gun or oil are employed with good results.

When there is no requirement that product be distinctly pure, starting materials of mixed identity can be employed. Thus when, as in some industrial productions, it is satisfactory to prepare a thioether of mixed identity and only generally conforming to an average analysis, starting materials of only generally acceptable identity can be employed and the resulting mixed product utilized without purification.

Over the methods known in the prior art, the present method offers numerous advantages. It permits conversion from a phenol or naphthol or substituted phenol or substituted naphthol into the corresponding thioether phenol or thioether (substituted) phenol or corresponding naphthol derivative in but two steps: thiocyanation and the present process.

The new method, by its brevity and simplicity, permits preparation of thioether phenols and thioether naphthols and their substituted derivatives in a range of variety hitherto unavailable. By the choice, as halogenated organic compound, of a polymer upon which appear reactive, that is to say, aliphatically bound, halogens, such as a polyvinyl chloro-bromide or an aliphatically halogenated polystyrene, it is possible to attach a hydroxy phenylthio or hydroxynaphthylthio group at the sites of such active halogen except only those which, as chemists will know, are sterically hindered to a high degree. Skilled analytical chemists will thus recognize that the process of the present invention lends itself to be employed in the preparation of special derivatives of aliphatic halogen-containing compounds or compounds believed to contain halogen whereby the hydroxy phenolthio or hydroxynaphthylthio group is introduced into such compounds at the halogenated site, with the result that the derivatives are frequently not only of substantially higher melting or boiling point, but also well-adapted to, for example, spectrum analysis of various kinds.

The following preparations illustrate the best aspects of the present invention now known to the inventors, but are not to be considered as limiting thereof.

*Example 1.—Preparation of p-(methylthio)phenol*

A first solution was prepared by adding 13.8 grams (0.6 mole) metallic sodium to 175 milliliters methanol to obtain a solution of 0.6 mole of sodium methoxide in substantial excess methanol. A second solution was prepared consisting essentially of 30 grams (0.2 mole) p-(thiocyanato) phenol and 28.4 grams (0.2 mole) methyl iodide dissolved in 150 milliliters methanol. The said first solution was added as a small, slow stream with continuous stirring to the second said solution to obtain a reaction mixture. Upon the completion of the preparation of the reaction mixture, the resulting mixture was heated at its boiling temperature (between 60 and 70° C.) and under reflux for approximately 2 hours to drive the reaction to completion. Upon the completion of the reaction, excess methanol as solvent was vaporized and removed, and the resulting residue poured into a mixture of ice and concentrated hydrochloric acid. Basic substances were neutralized and water-soluble neutralization products obtained, and the desired p(methylthio)phenol product separated as an insoluble solid which was collected from the aqueous liquid by filtration. The solid residue was taken up from the filter in, and recrystallized from, a mixed solvent system of which the solvent components were benzene and a mixed aliphatic hydrocarbon fraction boiling in a 60–70° C. temperature range. As a result of these procedures there was obtained 14.5 grams (51 percent by weight of starting p-(thiocyanato)phenol of a p-(methylthio)phenol product melting at 84–85° C. The melting point for this substance in the published literature is 84–85° C., although the literature process for its preparation required 6 steps and 8 original reactant substances.

All the products of the present invention can be prepared in essentially the same manner.

In procedures essentially the same as the foregoing, employing 4-thiocyanato-1-naphthol with methanol there is obtained a 4-methylthio-1-naphthol as off-white crystals melting at 105–107° C.

*Example 2.—Preparation of p-(cyclopropylthio) phenol*

A solution is prepared consisting essentially of 30 grams (0.2 mole) p-(thiocyanato) phenol and 15.3 grams (0.2 mole) chlorocyclopropane, (boiling at 41° C.) in 150 milliliters methanol. A second solution is prepared consisting essentially of 50 grams (0.75 mole) potassium hydroxide of approximately 85 percent purity, in 150 milliliters of water.

The aqueous potassium hydroxide is added in a slow stream to the said first solution to obtain a reaction mixture. When the addition is complete, the resulting reaction mixture is stirred continuously at room temperature for 10 hours. At the end of the 10 hour reaction time, the resulting mixture is gently warmed under subatmospheric pressure to vaporize and remove methanol and the resulting aqueous residue is poured into a mixture of ice and concentrated hydrochloric acid in an amount in excess of that equivalent to the employed potassium hydroxide. As a result of these operations, the ice melts and, from the resulting aqueous solution, upon standing, there separates a solid product which is collected by filtration, taken up from the filter paper in methanol and recrystallized from a methanol-water mixture to obtain a p-(cyclopropylthio) phenol as a white crystalline solid product. The yield is approximately 50 percent by weight of starting p-(thiocyanato) phenol. The product is germicidal.

*Example 3.—2,6-dichloro-4-(methylthio) phenol*

A first solution is prepared consisting essentially of 50 grams (0.75 mole) 85 percent pure potassium hydroxide dissolved in 150 milliliters water. A second solution is prepared consisting essentially of 55 grams (0.25 mole) 2,6-dichloro-4-(thiocyanato) phenol, and 35.5 grams (0.25 mole) methyl iodide dissolved in 300 milliliters methanol.

The said first solution is added as a small, slow stream continuous and with stirring over a period of time to the said second solution to obtain a reaction mixture. Upon the completion of the preparation of the said reaction mixture, the resulting solution is stirred continuously at room temperature for approximately 2 hours to carry the reaction to completion and obtain the desired product. At the conclusion of 2 hours reaction time, methanol is vaporized and removed and the resulting residue is poured into a mixture of ice and excess concentrated hydrochloric acid. From the resulting aqueous solution a solid product material separates and is collected by filtration, taken up in methanol and recrystallized from a methanol-water system to obtain 49 grams of a 2,6-dichloro-4-(methylthio) phenol product. The yield represents 94 percent conversion of the starting 2,6-dichloro-4-(thiocyanato) phenol. The product melts at 54–56° C. Upon analysis, a product representative of this example was found to have a content of carbon and hydrogen of 40.38 and 2.78 percent, respectively, as compared with theoretical values of 40.21 and 2.89 percent respectively. The assigned structure was confirmed by infrared spectrum analysis.

*Example 4*

In procedures essentially the same as those of Example 2, but employing 23.7 grams (0.2 mole) chlorocyclohexane (boiling at 142° C. under 760 millimeters pressure) there is obtained, as a white crystalline product p-(cyclohexylthio) phenol. The substance melts at 63.5° C.

*Example 5.—2-bromo-6-chloro-4-(methylthio) phenol*

A first solution is prepared consisting essentially of 34.2 grams (0.34 mole) triethylamine dissolved in 75 milliliters methanol. A second solution is prepared consisting essentially of 30 grams (0.113 mole) 2-bromo-6-chloro-4-(thiocyanato) phenol and 16.1 grams (0.113 mole) methyl iodide dissolved in 125 milliliters methanol. The first said solution is added as a small, slow stream continuously and with stirring to the said second solution to obtain a reaction mixture. Upon the completion of the preparation of the said reaction mixture, the resulting solution is stirred continuously as it is heated at its reflux temperature, about 60–70° C., for approximately 2 hours to carry the reaction to completion and obtain the desired product. At the conclusion of 2 hours reaction time, methanol solvent is vaporized and removed and the resulting residue is poured into a mixture of ice and excess concentrated hydrochloric acid. The resulting aqueous solution is extracted with three 200 milliliter portions of diethyl ether, the ether extracts combined, washed with saturated sodium chloride solution, and dried over anhydrous sodium sulfate. Ether is vaporized and removed and the resulting product distilled under subatmospheric pressure. As a result of these operations there is obtained a 2-bromo-6-chloro-4-(methylthio) phenol product as a white crystalline solid. The compound melts at 43–44.5° C. The assigned structure was confirmed by infrared spectrum analysis.

*Example 6.—p-(Allylthio) phenol*

A first solution is prepared consisting essentially of 146.2 gram (1 mole) p-hydroxyphenyl thiocyanate and 76.5 grams (1 mole) allyl chloride dissolved in ethanol (500 milliliters). A second solution is prepared consisting essentially of 40 grams (1 mole) sodium hydroxide dissolved in 100 milliliters water. The second said solution is added as a small, sow stream continuously and with stirring over a period of time to the said first solution to obtain a reaction mixture. Upon the completion of the preparation of said reaction mixture, the resulting solution is stirred continuously at ambient temperature (21–24° C.) for approximately 1 hour reaction time to carry the reaction to completion and obtain the desired product. Upon the conclusion of the reaction time, the resulting mixture is warmed in a vacuum oven and solvents are vaporized and in large part removed, and the resulting residue is poured into a mixture of ice and excess concentrated hydrochloric acid. From the resulting aqueous solution, an oily product material separates and is collected by ether extraction. Ether extract is warmed to vaporize and remove ether; the resulting oily product is taken up in and recrystallized from hot ethanol as it cools, to obtain a p-(allylthio) phenol product as white crystals. The compound melts at 42–43° C.

*Example 7.—4-(2-propynylthio)-3,5-xylenol*

A first solution is prepared consisting essentially of 10.2 gram (0.1 mole) triethylamine dissolved in 25 milliliters ethanol. A second solution is prepared consisting essentially of 17.5 grams (0.1 mole) 4-thiocyanato-3,5-xylenol, and 11.9 grams (0.1 mole) 3-bromopropyne-2 dissolved in 200 milliliters ethanol. The first said solution is added as a small, slow stream continuously and with stirring over a period of time to the said second solution to obtain a reaction mixture. Upon the completion of the preparation of the said reaction mixture, the resulting solution is stirred continuously at room temperature for approximately 3 hours reaction time to carry the reaction to completion and obtain the desired product. At the conclusion of the reaction time, ethanol is vaporized and removed and the resulting residue is poured into a mixture of ice and excess concentrated hydrochloric acid. From the resulting aqueous solution, a solid product material separates and is collected by filtration, taken up in hot ethanol and recrystallized therefrom with cooling to obtain a white, crystalline 4-(2-propynylthio)-3,5-xylenol product. The product is a crystalline solid melting at 64.5–65.5° C. The assigned structure is confirmed by infrared spectrum analysis.

The hydroxyphenyl thiocyanate (which may also be called a (thiocyanato) phenol) reactant of choice can readily be selected by selecting such compound wherein the (thiocyanato) group occupies the position whereinto it is desired to introduce the

moiety characteristic of the products of the present invention.

The halo-organic compound reactant of choice can readily be selected by choosing the

compound whereof R' has the identity of the thioetherifying moiety it is desired to introduce into the product compound and X is halogen chosen for convenience.

In view of the detailed statements of the best methods now known, as hereinbefore set forth, and with the guidance of the foregoing comments on selection of reactants, skilled chemists can readily prepare desired other products according to the present process.

The following are representative of starting materials thus elected, and their products.

Employing 3-fluoro-4-(thiocyanato)phenol and by sparging methyl bromide gas thereinto, in methanol solution in the presence of sodium methoxide, a white, crystalline 3-fluoro-4-(methylthio)phenol product.

Repeating the above but using 3-chloro-4-(thiocyanato) phenol, a 3-chloro-4-(methylthio) phenol product as a white crystalline solid melting at 66.5–68° C.

Employing 2-(methylthio)-4-thiocyanatophenol, and with methyl iodide, there is obtained a 2,4-bis-(methylthio) phenol product as an oily liquid. Upon crystallization from solvent the product is a white, crystalline solid melting at 40–41° C.

From 1-bromo-2-cyanoethane and 2-methyl-4-hydroxyphenyl thiocyanate, a 4-(2-cyanoethylthio)-m-cresol product. The substance melts at 85–86° C.

From 1-bromo-2-chloroethane and 2-phenyl-4-(thiocyanato) phenol, a 4-(2-chloroethylthio)-2-phenyl phenol product as a white crystalline solid.

From 2-nitro-4-thiocyanatophenol and α-chloro-o-xylene, a white, crystalline solid 4-(o-methylbenzylthio)-2-nitrophenol product.

From 3-cyano-4-thiocyanatophenol and acetyl chloride, 2-cyano-4-hydroxyphenyl S-thioacetate.

From 4-hydroxy-3-vinylphenyl thiocyanate and 1-bromobutane, 4-(butylthio)-2-vinylphenol.

From 2-hydroxy-5-thiocyanatophenyl acetate and 1-bromo-3-chloropropane in equimolecular amounts, a 5-(3-chloropropylthio)-2-hydroxyphenyl acetate.

From 2-(p-chlorophenoxy)-4-thiocyanato phenol and butyl chloride, 2-(p-chlorophenoxy)-4-(butylthio) phenol.

From 2,3,5,6-tetrakis(methoxy)-4-hydroxyphenyl thiocyanate and methyl bromide, 2,3,5,6-tetrakis(methoxy)-4-(methylthio)phenol.

From 2-benzyl-3-cyano-4-thiocyanatophenol and an equimolecular amount of α-benzylbromide, 2-benzyl-3-cyano-4-(benzylthio)phenol.

From 2-cyclopentyl-4-(thiocyanato)phenol and stearoyl chloride, a 3-cyclopentyl-4-hydroxyphenylthiostearate.

From 5-hydroxy-2-thiocyanatobenzamide and chlorocyclohexane, 5-hydroxy-2-cyclohexylthiobenzamide.

From 3-ethynyl-4-thiocyanatophenol and iodomethane, 3-ethynyl-4-(methylthio)phenol.

Also, in manners similar to the foregoing and employing a dihalohydrocarbon of the formula $X_2R$, and a total of two molecular proportions of (thiocyanato)phenol, bis compounds of the type

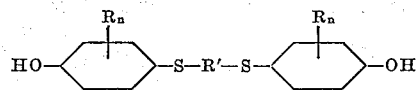

are prepared. When the hydroxyphenolthio moieties are to be alike, the dihalo compound XR' can have both halogens alike or different, one molecular proportion is employed, and the (thiocyanato) phenol is employed in two molecular proportions. For example, employing 2 moles of p-hydroxyphenylthiocyanate and one mole of 1,2-dibromoethane there is obtained a 1,2-bis(p-hydroxyphenylthio)ethane.

When the hydroxyphenylthio moieties are to be unlike the halogens of the compound X—R' are also unlike, the heavier halogen reacting first. Such reaction, employing equimolecular amounts of reactants, obtains a hydroxyphenylthiohaloorganic compound of which the foregoing 4-(2-chloroethyl) thio-2-phenylphenol is representative, the active halogen—here the chloro on the chloroethyl moiety—can then further be caused to react with further (thiocyanato)phenol the same or different, to obtain a bis compound, of which the hydroxy phenylthio groups are unlike. For example, by causing the foregoing 4-(2-chloroethyl)thio-2-phenylphenol to react with 3-chloro-4-hydroxyphenyl thiocyanate, one obtains a 4-(3-chloro-4-hydroxy(phenylthio)ethyl)thio-2-phenylphenol product. This is a white, crystalline solid of distinct odor and is a highly effective germicide.

We claim:
1. p-Cyano(ethylthio) m-cresol.
2. 1,2-bis(p-hydroxyphenylthio) ethane.
3. 4-methylthio-1-naphthol.
4. p-(Cyclopropylthio) phenol.
5. 2,6-dichloro-4-(methylthio) phenol.
6. p-(Cyclohexylthio) phenol.
7. 2-bromo-6-chloro-4-(methylthio) phenol.
8. 4-(2-propynylthio)-3,5-xylenol.
9. 3-chloro-4-(methylthio) phenol.

References Cited by the Examiner

UNITED STATES PATENTS 2,074,851  3/1937  Miller _____ 260—150
2,976,325  3/1961  Long et al. _____ 260—609

CHARLES B. PARKER, *Primary Examiner.*

JOSEPH P. BRUST, *Examiner.*

DELBERT R. PHILLIPS, *Assistant Examiner.*